Oct. 8, 1957  R. C. HILLS  2,809,095
PRODUCTION OF SULFURIC ACID FROM DARK SULFUR
Filed Aug. 19, 1953
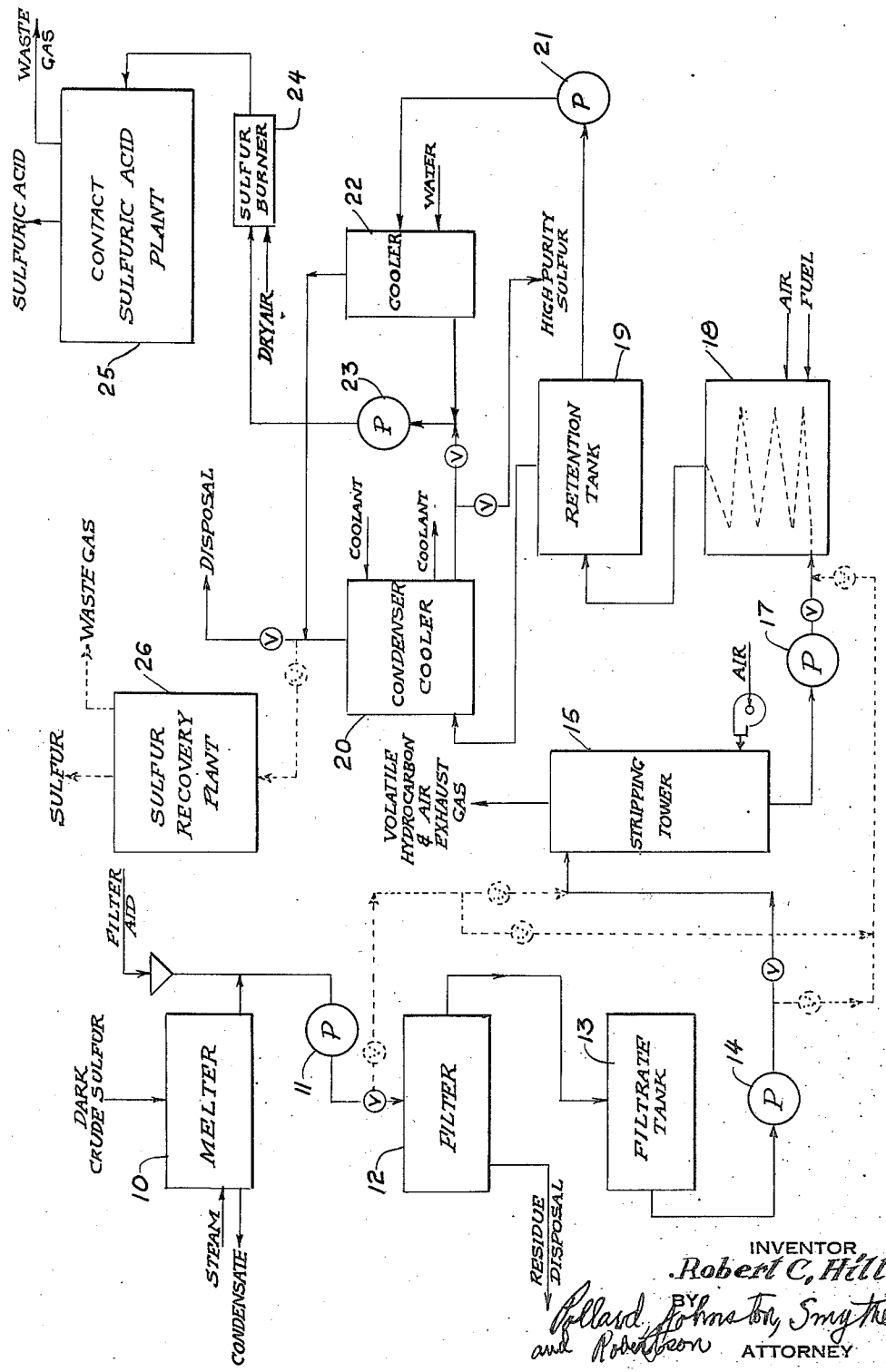
INVENTOR
Robert C. Hills
BY
Pillard, Johnston, Smythe
and Robertson
ATTORNEY

United States Patent Office 2,809,095
Patented Oct. 8, 1957

2,809,095

PRODUCTION OF SULFURIC ACID FROM DARK SULFUR

Robert C. Hills, New York, N. Y., assignor to Freeport Sulphur Company, New York, N. Y., a corporation of Delaware Application August 19, 1953, Serial No. 375,207

2 Claims. (Cl. 23—167)

This invention relates to the production of sulfuric acid by the catalytic or "contact" method from so-called dark sulfur containing hydrogen.

In modern, so called "hot-type," contact sulfuric acid plants, combustion air is dried with sulfuric acid and then used to burn the sulfur. The resulting hot sulfur dioxide containing gases are cooled somewhat in waste heat boilers and then passed through catalyst, usually of the vanadium pentoxide type, to convert the sulfur dioxide to sulfur trioxide. After cooling, the sulfur trioxide is absorbed in strong acid to produce sulfuric acid and/or oleum. It is important that the gases going to the catalyst contain only traces of water vapor, otherwise the moisture, together with the sulfur trioxide, forms mist which is exceedingly difficult to remove from the gas stream and usually a portion of the mist will pass through the absorbers and not only represent a loss but also be an atmospheric pollutant.

When so-called dark sulfur, that is, sulfur containing more than a trace of carbonaceous material, is burned, the hydrocarbon content of the dark sulfur burns to carbon dioxide and water vapor. The carbonaceous material present in crude dark sulfur is predominantly in the form of hydrocarbons. Although the carbonaceous content of the sulfur is usually expressed in terms of the carbon present, the hydrogen content can be readily determined from established ratios of hydrogen to carbon in the hydrocarbons. Minor amounts of hydrogen may be present as hydrogen sulfide. On burning sulfurs containing hydrogen, which may be in the form of hydrocarbons or other hydrogen compounds, in amounts up to 0.05% by weight, the resulting moisture or water vapor is not particularly high and can be tolerated in most contact acid plants. However, with sulfurs containing more hydrogen, say about 0.06% or more, the formation of acid mist becomes more and more of a problem.

Processes are known for purifying sulfur containing hydrocarbon, such as by filtration and/or vaporization. Such purification processes, however, are either too expensive or result in such an excessive loss of sulfur that they are not economically feasible in the production of sulfuric acid from dark sulfur.

It is the primary purpose of this invention to provide an efficient process for the production of sulfuric acid by the contact method from dark sulfur containing hydrogen in the form of such compounds as hydrocarbons, sulfohydrocarbons and hydrogen sulfide.

It is a special object of this invention to provide a process whereby sulfuric acid can be produced from dark sulfur with little or no sulfur loss.

It is another special object of this invention to provide a process for the production of sulfuric acid from dark sulfur containing significant amounts of hydrocarbons without using filtration after subjecting the dark sulfur to liquefaction and elevated temperatures.

In the process the dark sulfur is raised to a temperature above 350° F. and preferably above 600° F. but customarily substantially below the boiling point of sulfur, say not substantially above 750° F. In heating the liquid sulfur at said temperature, the hydrocarbons react with the sulfur to form hydrogen sulfide gas, which is removed, and a carbon-sulfur complex compound containing only a very small amount of hydrogen. The sulfur still containing the carbonaceous material, predominantly in the form of a sulfur-carbon complex, is burned to form sulfur dioxide and carbon dioxide. The sulfur dioxide gas and excess air are then brought into contact with the catalyst and the resulting sulfur trioxide absorbed in strong sulfuric acid to produce sulfuric acid and/or oleum.

In accordance with a specific procedure, the dark sulfur containing carbonaceous material is melted and pumped rapidly through a heater which raises the temperature to above 600° F. The heated sulfur is held at this temperature for a period of time ranging from five minutes to an hour or more in order to maintain the reaction between the hydrogen-containing material and the sulfur. Advantageously, the liquid sulfur is retained at the desired elevated temperature until the hydrogen content of the sulfur not reacted to form hydrogen sulfide does not exceed 0.05% by weight. During this heating period the hydrogen sulfide is vaporized but only a relatively small percentage of the sulfur is vaporized off due to its relatively small partial pressure at the temperatures employed. After the heating the molten sulfur is cooled to a temperature of about 300° F. at which temperature additional hydrogen sulfide is given off due to hydrogen sulfide having a lower solubility in liquid sulfur at 300° F. than at 600° F. Then, the liquid sulfur, still containing the carbonaceous material, is burned to sulfur dioxide and carbon dioxide with dry air. The sulfur dioxide is contacted with the catalyst and converted into sulfur trioxide and then recovered in strong sulfuric acid in a known manner.

The gas formed in the heater which contains by-product hydrogen sulfide and some sulfur vapor is cooled and the elemental sulfur contained therein condensed. The condensed sulfur is of high purity and may either be returned to the system or used per se as a substantially carbon-free sulfur for other purposes.

In accordance with a special embodiment of the invention, the dark sulfur may be stripped of volatile hydrocarbon materials by passing through the sulfur in the liquid stage at temperatures below 350° F. an inert gas stream. In this manner the amount of sulfur carbon complex produced in the system is lessened and the possibility of resinous carbon sulfur complexes being produced and deposited on the walls of the apparatus during the heating and/or burning is substantially lessened.

In order to heat the sulfur to treatment temperature, which drives off the hydrogen as hydrogen sulfide, we prefer to pump it through a tube still at a linear velocity of at least 4 feet per second and preferably 8–12 feet per second. Whereas any method of heating the sulfur to a sufficiently high temperature for the reaction to take place will remove hydrogen as hydrogen sulfide, it is preferable to heat the sulfur rapidly to avoid the formation of coke-like material on heat exchanger surfaces. Heat for the treatment process may be supplied by burning any gaseous, liquid or solid fuel in the heater by well known techniques or by burning part or all of the liquid sulfur in the heater, the combustion gases from which could be led directly into the contact sulfuric acid plant.

In many well known applications it is common practice to filter the melted sulfur before processing in order to remove non-combustible materials, commonly known as ash, which might cause mechanical difficulties in the process equipment. The filterability of the liquid sulfur is quite good at temperatures between about 245° F. and 325° F., and before the liquid sulfur has been heated above 350° F. In this filtration step only a very small amount, if any, carbonaceous material is removed from the sulfur.

The invention will be readily understood from the attached flow sheet. As will be seen from this flow sheet the crude mined sulfur is first melted in a melter 10. The melted sulfur can then be filtered by forcing it through a filter 12 with pump 11 and into the filtrate tank 13. The filtered sulfur, at a temperature below say 340° F., is advantageously forced by pump 14 to the top of the stripping tower 15 where it flows downward in countercurrent flow to air flowing upward through the tower and passing out of the top of the tower, thereby entraining hydrocarbons which are not bound as sulfur complexes. Then the liquid sulfur is forced by pump 17 into a heater 18 where the temperature is rapidly raised to the desired temperature above 350° F. and advantageously to temperatures of at least 600° F. The heated sulfur is passed into a retention tank 19 and held at the desired elevated temperature for a period of five minutes to an hour or more, depending upon the temperature used and upon the hydrogen-containing impurities present. During this retention time $H_2S$ gas is vaporized off and passes to the condenser cooler 20 where the sulfur is condensed and either returned to the system or separately recovered. After the sulfur has been held in the retention tank for the desired period of time it is pumped by pump 21 into a liquid cooler 22 where the temperature is advantageously reduced to about 300° F. and additional hydrogen sulfide gas is recovered. The cooled liquid sulfur is passed by pump 23 into a sulfur burner 24 and burned therein with an excess of dry air to produce sulfur dioxide-containing gas. The gas containing $SO_2$ is passed into the contact sulfuric acid plant 25 where the $SO_3$ is produced and absorbed in strong sulfuric acid in a known manner.

The hydrogen sulfide containing gases from the condenser cooler 20 and liquid cooler 22 may be discarded to waste or treated in a sulfur recovery plant 26 by any of several well known processes to recover the contained sulfur which may be returned to the system or used otherwise for processes requiring high purity sulfur.

The following examples further illustrate the invention.

*Example 1*

Ten thousand pounds of sulfur per hour containing 50 pounds (0.5%) of carbon, 8.2 pounds (0.082%) of hydrogen, and 1.0 pound (0.01%) of non-combustibles (ash) were melted and filtered to remove the non-combustibles. Approximately 2.2 pounds of filter aid were added and about 1.0 pound of non-combustibles (ash), 1.8 pounds of carbon, 0.1 pound of hydrogen and 68.1 pounds of sulfur were lost in the filter cake. The filtered sulfur was blown by countercurrent contact with air. About 9.7 pounds of carbon and 1.6 pounds of hydrogen in the form of hydrocarbons were stripped from the sulfur. The air-blown sulfur was then heated to 650° F. and held at this temperature for one half hour. Vapors were developed containing hydrogen sulfide and sulfur vapor which, after being cooled to 300° F., condensed out the sulfur in a very pure state. The uncondensed vapors containing about 50.8 pounds of hydrogen sulfide were treated by well known processes to recover the sulfur values therein.

The heated liquid sulfur was cooled to about 300° F. which caused the additional liberation of about 7.9 pounds of hydrogen sulfide, the sulfur values being recovered subsequently by inclusion with the gases from the condenser as noted previously. After the heat treatment the combined sulfur from the gas condenser and liquid cooler contained approximately 38.6 pounds of carbon, predominantly as carbon-sulfur complex, and 3.2 pounds (0.033%) of hydrogen. The resulting sulfur was burned to sulfur dioxide without the formation of objectionable amounts of acid mists. Sulfur dioxide gases were passed to the sulfuric acid catalysts and converted into sulfur trioxide and the resulting gases recovered as sulfuric acid in accordance with known procedures.

*Example 2*

Ten thousand pounds of sulfur per hour containing 100 pounds (1.0%) of carbon, 16.1 pounds (0.161%) of hydrogen, and 1.0 pound (0.01%) of non-combustibles (ash) were melted and filtered to remove the non-combustibles. Approximately 2.2 pounds of filter aid were added and about 1.0 pound of non-combustibles (ash), 4.0 pounds of carbon, 0.3 pound of hydrogen and 111.6 pounds of sulfur were lost in the filter cake. The filtered sulfur was blown by countercurrent contact with air. About 19.2 pounds of carbon and 3.2 pounds of hydrogen in the form of hydrocarbons were stripped from the sulfur. The air-blown sulfur was then heated to 650° F. and held at this temperature for one half hour. Vapors were developed containing hydrogen sulfide and sulfur vapor which, after being cooled to 300° F., condensed out the sulfur in a very pure state. The uncondensed vapors containing about 123.6 pounds of hydrogen sulfide were treated by well known processes to recover the sulfur values therein.

The heated liquid sulfur was cooled to about 300° F. which caused the additional liberation of about 7.7 pounds of hydrogen sulfide, the sulfur values being recovered subsequently by inclusion with the gases from the condenser as noted previously. After the heat treatment the combined sulfur from the gas condenser and liquid cooler contained approximately 77.0 pounds of carbon, predominantly as carbon-sulfur complex, and 4.8 pounds (0.05%) of hydrogen. The resulting sulfur was burned to sulfur dioxide without the formation of objectionable amounts of acid mists. Sulfur dioxide gases were passed to the sulfuric acid catalysts and converted into sulfur trioxide and the resulting gases recovered as sulfuric acid in accordance with known procedures.

The sulfur losses incurred for Example 1 were of the order of 1.0% and the sulfur losses incurred for Example 2 were of the order of 2.4% including the sulfur lost as hydrogen sulfide. These sulfur losses could be reduced further by recovering the sulfur from the formed hydrogen sulfide. These sulfur losses compare most favorably with certain known purification processes, such as the known boiler treatment process, wherein sulfur losses are of the order of 7–15%.

The foregoing description constituting illustrative embodiments of this invention are not to be considered a limitation thereupon for the invention contemplates various adaptations, alterations and modifications expected of those skilled in the art, encompassed within the scope of the appended claims.

What is claimed is:

1. A process for the production of sulfuric acid from dark sulfur containing a minor amount of carbon-bound hydrogen which is in excess of 0.06% of the weight of the sulfur and in an amount rendering the sulfur unsuitable for burning and conversion of the $SO_2$-containing combustion gases to sulfuric acid by the contact method, which comprises flowing dark sulfur in a molten state at a temperature below 350° F. counter current to a stream of air until volatile hydrocarbons are stripped from the sulfur, heating the sulfur in a closed container to a temperature above 350° F. but below the boiling point of sulfur while venting formed gases and until the carbon-bound hydrogen content of the sulfur does not exceed 0.05% by weight, burning the sulfur and the residual carbonaceous material contained therein to form combustion gases containing $SO_2$ and $CO_2$, using the formed combustion gases to form sulfuric acid by the contact method in a contact sulfuric acid plant, and venting the $CO_2$-containing waste gases from said plant.

2. A process for the production of sulfuric acid from dark sulfur containing a minor amount of carbon-bound hydrogen which is in excess of 0.06% of the weight of the sulfur and in an amount rendering the sulfur unsuitable for burning and conversion of the $SO_2$-containing combustion gases to sulfuric acid by the contact method, which comprises flowing dark sulfur in a molten state at a temperature below 350° F. counter current to a stream of air until volatile hydrocarbons are stripped from the sulfur, rapidly heating the sulfur in a closed container to a temperature of at least 600° F., continuing heating the sulfur in a closed container at a temperature above 600° F. but below the boiling point of sulfur while venting formed gases and until the carbon-bound hydrogen content of the sulfur does not exceed 0.05% by weight, burning the sulfur and the residual carbonaceous material contained therein to form combustion gases containing $SO_2$ and $CO_2$, using the formed combustion gases to form sulfuric acid by the contact method in a contact sulfuric acid plant, and venting the $CO_2$-containing waste gases from said plant.

References Cited in the file of this patent
UNITED STATES PATENTS

| | | |
|---|---|---|
| 2,079,760 | Carl | May 11, 1937 |
| 2,092,625 | Rich | Sept. 7, 1937 |
| 2,118,333 | Wieder | May 24, 1938 |
| 2,153,337 | Oliver | Apr. 4, 1939 |